Oct. 18, 1960 W. L. PERRINE 2,956,439
MULTIPLE MOTION MECHANICAL INTEGRATOR
Filed April 22, 1958 3 Sheets-Sheet 1

INVENTOR.
WARREN L. PERRINE,
BY
Beehler & Shanahan
ATTORNEYS.

Oct. 18, 1960  W. L. PERRINE  2,956,439
MULTIPLE MOTION MECHANICAL INTEGRATOR
Filed April 22, 1958  3 Sheets-Sheet 2

INVENTOR.
WARREN L. PERRINE,
BY
Beehler & Shanahan
ATTORNEYS

Oct. 18, 1960 — W. L. PERRINE — 2,956,439
MULTIPLE MOTION MECHANICAL INTEGRATOR
Filed April 22, 1958 — 3 Sheets-Sheet 3
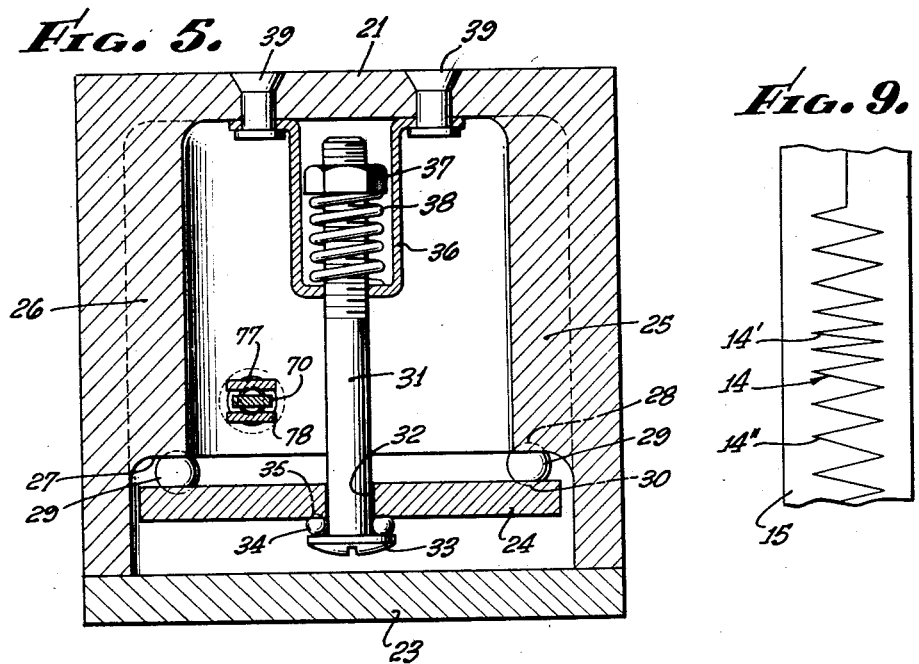
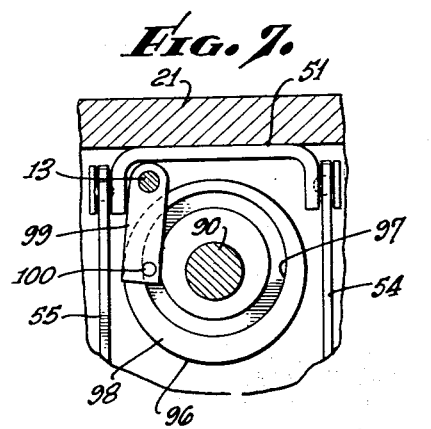
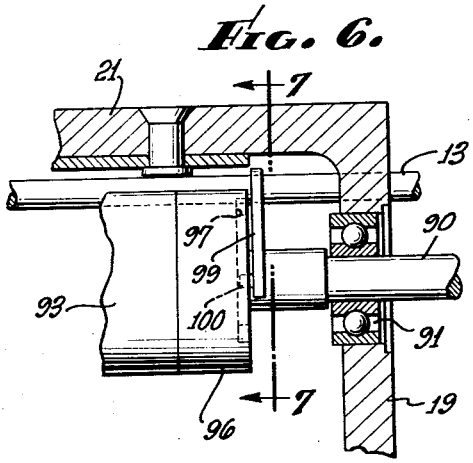
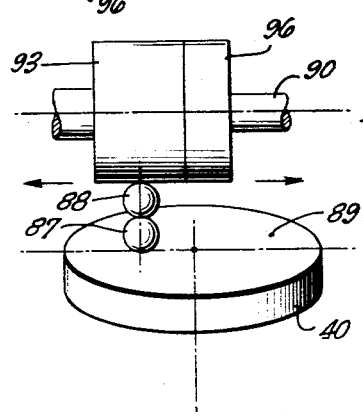
INVENTOR.
WARREN L. PERRINE
BY
Beehler & Shanahan
ATTORNEYS.

United States Patent Office 2,956,439
Patented Oct. 18, 1960

2,956,439

MULTIPLE MOTION MECHANICAL INTEGRATOR

Warren L. Perrine, 12671 Bubbling Well Road, Santa Ana, Calif.

Filed Apr. 22, 1958, Ser. No. 730,207

18 Claims. (Cl. 74—198)

The invention relates to integrating apparatus and has particular reference to a mechanical device which, when set to separate but similar motions, is adapted to correlate the two motions into a single motion which, when employed as, for example, to trace a mark upon a tape traveling at a predetermined rate, can be used to indicate quantity over a given period of time.

More particularly, the invention relates to a mechanical integrating device of a compact nature capable of being made in relatively small sizes and used where delicate and accurate measuring means are requisite and which, for example, is capable of having fed to it simultaneously motions predicated on a time interval and upon a temperature condition, which condition may vary with respect to time, and to combine those motions into a single motion which will vary with the input, the single motion being used, for example, to operate a pen for tracing a line on a tape which travels at a predetermined rate and thus provide markings on the tape which can be read as quantities.

Although various types of integrating devices have been patented on previous occasions, the construction and arrangement of such devices, though acceptable for some types of work, have been found to possess limitations which prevent their being used in other types of work where perhaps a greater degree of accuracy might be requisite, or where the instrument need for some reason or other be made in a very small package.

It is, therefore, among the objects of the invention to provide a new and improved integrating device which is capable of a high degree of accuracy in operation.

Another object of the invention is to provide a new and improved integrating device where friction present in the sundry necessary moving parts of the device is maintained virtually at a minimum and, in consequence, enabling the device to be adjusted to a very fine degree without likelihood of producing any binding effect upon the relatively moving parts.

Another object of the invention is to provide a new and improved mechanical integrating device of such design and construction that the moving parts can be machined to extremely close tolerances, thereby enabling the device to operate with a high degree of accuracy and the close tolerances being possible of use without risk of undesirable binding at any point.

A still further object of the invention is to provide a new and improved mechanical integrating device of such design and construction that it can be constructed of very small parts compared to those heretofore employed, and in consequence, being capable of production in miniature.

Still further, among the objects of the invention, is to provide a new and improved integrating device which, by reason of its having of various input motions, is able to translate those motions into a single output motion which, when operated upon a chart, makes possible a high "read-out," thereby to greatly improve the rapidity and accuracy of reading the integrated results.

Also included among the objects of the invention is to provide a new and improved mechanical integrator which, by virtue of its construction and design, substantially minimizes the problems of application and assembly with a corresponding decrease in the cost of manufacture.

With these and other objects in view, the invention consists in the construction, arrangement, and combination of the various parts of the device whereby the objects contemplated are attained, as hereinafter set forth, pointed out in the appended claims and illustrated in the accompanying drawings.

In the drawings:

as shown in Figure 1.

Figure 5 is a vertical sectional view taken on the line 5—5 of Figure 1;

Figure 6 is a fragmentary sectional view taken on the line 6—6 of Figure 1;

Figure 7 is a fragmentary sectional view taken on the line 7—7 of Figure 6;

Figure 8 is a schematic perspective view showing the relationship between the basic moving parts of the device; and Figure 9 is a fragmentary view of a moving tape showing the type of line traced by an output element of the machine.

Figure 1:
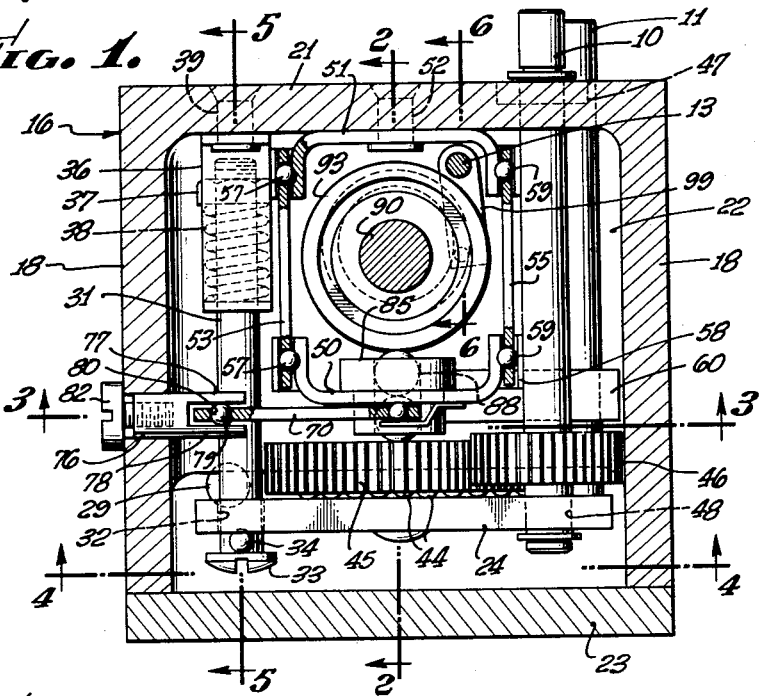
Figure 1 is a vertical sectional view taken on the line 1—1 of Figure 2.

To appreciate the operation of the device, attention is directed to the common expedient of employment of a moving chart driven either in a linear direction or circular direction in company with operation of a pen positioned to trace a line upon the chart. Depending upon what is to be measured, the line may trace variations in temperature, pressure, liquid level, and a wide variety of physical measurements. Although charts which trace curves may be subject to evaluation by mechanical means to interpret the markings to a greater degree than is possible from visual observation, integration of the markings by such means takes considerable time and does not always have the degree of accuracy needed.

An important application for the device herein disclosed is in gas chromatography where flow is measured as a function of a thermal conductivity difference, a thermal conductivity cell and electro servo mechanism being used as the input to the integrator. The trace of markings resulting from operation of the machine under such circumstances can be read as an accurate measure of analysis.

Another application of the device is one wherein motion fed to the integrator can be taken from a temperature sensing bellows and the integrator then made use of to measure quantity of heat.

In the device here shown, a power input shaft 10 which has a timed rate of rotation such as would be produced by the clock drive of a chart, is rotatively mounted upon the housing and causes certain portions of the mechanism in the housing to rotate.

A secondary input shaft 11 may be an oscillating shaft rotating alternately in one direction or the other depending upon temperature conditions, for example, in a fluid conduit and functioning to influence the operation of the integrator mechanism.

An output shaft 13 (Figures 1 and 6) picks up the combined effect of the two input shafts and oscillates at a rate dependent upon the combined motion of the input shafts and the output shaft may have connected thereto a pen and pen arm (not shown) whereby to trace what may be described as a sawtooth line 14 upon a moving chart or tape 15. Inasmuch as the rate of travel of the chart 15 will be constant and, since the amplitude of swing of the line 14 will be constant, the frequency of imprints of a sawtooth character on the tape will be the combined result of the motions of the two power input shafts, one being dependent upon variations in the temperature condition and the other being dependent upon time. The resulting chart, as illustrated in Figure 9, is one which can readily be read and interpreted as quantity without it being necessary, as has been true in the past, to measure and compare areas.

More particularly, the device is contained within a housing 16 which in actual practice can be as small as one to one-half inches square. As here shown, the housing comprises sidewalls 17, 18, 19, and 20 and a top 21 cast as a box-like structure to form a chamber 22, and a removable base or bottom 23 attached to the sidewalls by conventional means, not shown.

Figure 2:
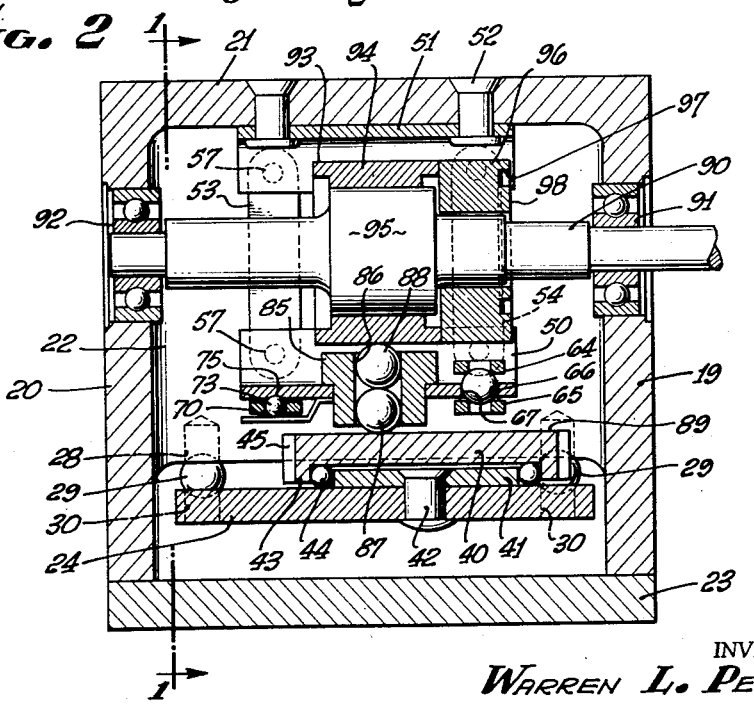
Figure 2 is a vertical sectional view taken on the line 2—2 of Figure 1.

In the lower portion of the chamber 22 is a supporting plate 24, the supporting plate being provided with a special mounting within the housing for purposes of adjustment. To make provision for the special mounting thickened portions 25, 26 of the housing provide downwardly facing shoulders 27 in which are ball recesses 28 which receive balls 29 (Figures 1, 2 and 5). Similar ball recesses 30 on the upper face of the supporting plate receive the same balls 29, holding them in the desired position.

In order to hold the supporting plate upwardly against the balls 29 a bolt 31 is employed extending upwardly through a hole 32 in the plate midway between the balls 29. A head 33 on the bolt bears indirectly against the plate by pressing against balls 34 which are seated in appropriate ball recesses 35 in the plate. The bolt extends upwardly into a bracket 36 and a nut 37 confines a spring 38 between the bottom of the bracket and the nut. The bracket in turn is anchored by means of rivets 39 to the top 21 of the housing. It will be noted by reference to Figure 1 of the drawing that the bolt, when rotated in a screw-in or right-hand direction, tends to press against the bottom of the plate and to increase the effect of the spring 38. Adjustment in a contrary direction is achieved by rotating the bolt in a reverse direction which releases tension in the spring to decrease the effect of friction and the friction surfaces affected by the adjustment. In the selected condition of adjustment the plate is free to move up and down to a limited extent to provide for irregularities in the rotating parts and the possibility of presence of dust or dirt that the ball may have to roll over.

The adjustment is a means of applying a normal force at the point of friction contact of balls 87 and 88 and is more particularly a means of varying the force in order to increase (or decrease) the driving torque of the integrator.

A disc or rotating platform 40 is mounted upon the supporting plate 24. In order to effectively mount the platform so that a minimum of friction will be generated there is provided a circular bearing disc 41 which is anchored to the platform by employment of a rivet 42. On the underside of the platform is an annular flange 43 spaced from the circumference of the bearing disc and forming an annular track therebetween. A circle of leading balls 44 alternating with follower balls 44' fills the annular track. The circumference of the balls is large enough to support the platform entirely free in a horizontal position above the plate 24 and in a manner permitting it to rotate with an extreme degree of ease. To cause the platform to rotate and thus perform its operation in the device, the circumference of the platform comprises a ring gear 45 which meshes with a gear 46 of smaller diameter, the gear 46 being keyed by appropriate conventional means to the input power shaft 10. To further improve the smoothness of operation, the input power shaft is journaled in a bearing 47 in the top 21 of the housing and is also journaled in an appropriate bearing recess 48 in the plate 24.

Figure 3:
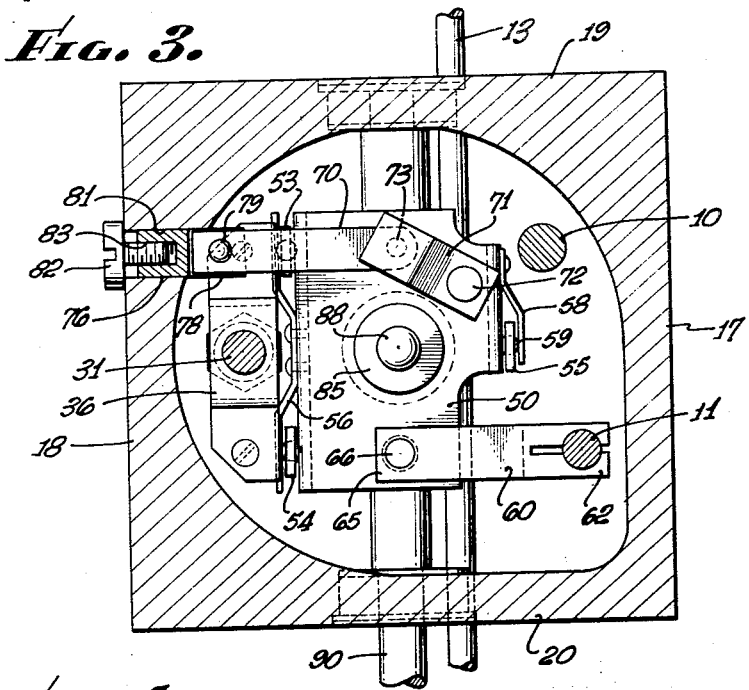
Figure 3 is a cross-sectional view taken on the line 3—3 looking upward in the direction of the arrows.
Figure 4:
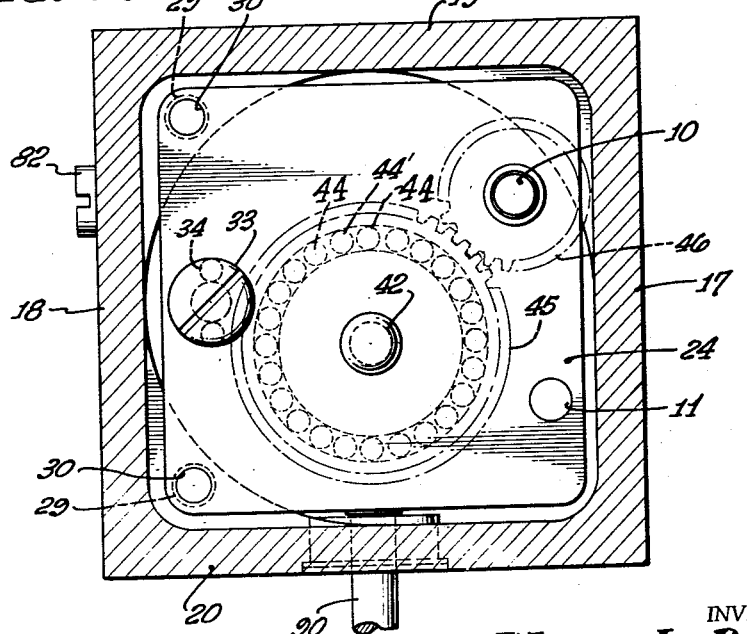
Figure 4 is a cross-sectional view as taken on the line 4—4 of Figure 1 looking upward in the direction of the arrows.

Parallel to the platform and spaced above it within the chamber 22 is a carriage 50. The carriage is suspended in its position in the chamber by use of a carriage support 51 secured to the top 21 of the housing by means of rivets 52 and links 53, 54, 55. Universal joints or connections are used to attach the tops and bottoms of the links respectively to the carriage support and to the carriage. Links 53 and 54 are attached at both tops and bottoms by means of clips 56, the form of which is best shown in Figure 3, the clips being employed to confine balls 57. The link 55 is secured at both top and bottom by a slightly different clip 58 which confines a ball 59 in each instance. The universal joints thus provided permit a certain limited freedom in virtually all directions, but particularly permit free movement of the carriage in its suspended position in a vertical plane parallel to the links 53, 54, and 55.

To achieve the purpose herein set forth, it is essential that the movement of the carriage be confined substantially to a line in a plane parallel to the links. This is accomplished by use of swing arms 60 and 70. The swing arm 60, as best ascertained by reference to Figure 3, has a split end 62 anchored non-rotatably by suitable conventional anchoring means to the secondary input shaft 11. The swing arm 60 is provided with upper and lower fork elements 64 and 65 which confine a ball 66 between them. An aperture 67 in the carriage receives the ball in its confined position and by this means the swing arm 60 is provided with a universal, substantially friction-free connection to the carriage. A swing arm 70 serves to secure the opposite end of the carriage. The swing arm 70 has a universal connection to the carriage provided by a clip 71 secured to the carriage by an appropriate rivet by means of which a ball 73 is held in place within a ball recess in the end of the swing arm 70. The ball is contained in a hollow 75 on the underside of the carriage.

At its opposite end, the link is connected to a screw plug 76. As shown to good advantage in Figures 1 and 3, the screw plug is provided with fork elements 77 and 78 which hold a ball 79 between them, the ball being contained in a ball recess 80 in the appropriate end of the swing arm 70. The screw plug is adapted to slide in an axial direction within a hole 81 which extends through the sidewall 18 of the housing. To adjust the position of the screw plug, a machine screw 82 can be manipulated into and out of a threaded hole 83 in the screw plug, thereby to move the swing arm 70 in an endwise direction. Mounted in the carriage 50 is a ball bushing 85. The ball bushing has a vertical bore 86 extending therethrough in which is located balls 87 and 88, one above the other and in rolling contact with each other. The ball 87 is positioned to roll upon an upper face 89 of the platform 40.

A roller shaft 90 is of somewhat composite construction and is rotatably mounted in sidewalls 19 and 20 of the housing by means of bearings 91 and 92. The roller shaft has a large, cylindrical rolling surface 93 of appreciable length substantially midway between the sidewalls 19 and 20. This cylindrical rolling surface may, if preferred, be a sleeve 94 immovably secured to an enlargement 95 at the mid-portion of the roller shaft. The upper ball 88 is in rolling engagement with the cylindrical exterior rolling surface 93 of the sleeve 94.

Manipulation of the screw plug 76 causes a shifting of the location of the ball 73, the effect of which is to change the position of a line through the centers of balls 73, 87 and 66 to a new position. The axis of the carriage may be designated as a line through the balls 73, 87 and 66. In practice, when the platform moves, the axis may shift in an arcuate direction parallel to the platform 40 an angular distance of ±2° about the vertical axis of balls 87, 88 as a center.

There are several desirable results of the adjustment. (a) It enables the ball path at the point of contact of the ball 87 with the platform 40 to pass exactly over the center of rotation of the platform and substantially parallel to the axis of rotation of the roller shaft 90 and hence that of the sleeve 94 and in the same vertical plane. (b) Proper adjustment reduces wear at the center of the platform 40. (c) Friction generally is reduced to the lowest practical minimum for the combination shown, except for necessary drive friction to provide traction between the balls 87, 88, the sleeve 94 and platform 40. (d) Alignment of the balls is improved with respect to the sleeve 94.

The slight arcuate deviation of the carriage 50 plus or minus 2° in the chosen form in no way diminishes the precise dependable performance of the device. It is the intent of the parallelogram action of links 53, 54, 55, carriage 50, and support 51 to cause the carriage to be parallel to the support 51 at all times. It will be noted, however, that this is true to an approximate degree only, due to the plus or minus 2° rotation of the carriage 50. For example, at the mid-position, the ball 59 at the lower end of link 55, located as it is intermediate links 53 and 54, is not in the same relative position in the arc of travel as the ball 57 at the lower ends of links 53 and 54.

Also secured upon the roller shaft 90 is a cam 96. The cam has a cam track 97 in a face 98 of the cam. The cam track is an endless track eccentric with respect to the axis of the shaft 90. The positioning and the form of the cam track is readily discernible in Figures 1 and 7.

The output shaft 13 is rotatably mounted in the housing in the sidewalls 19 and 20. The output shaft has non-rotatably secured thereto a cam arm 99 at the other end of which is a cam follower 100 which is located in the cam track 97. When the roller shaft 90 and the cam 96 is rotated, the cam track 97 rotates and imparts to the cam follower 100 an oscillating movement which is transferred to the output shaft 13 which is thereby given an oscillating movement.

In operation power is applied to the input power shaft 10. The application of power is preferably at a fixed rate and can be, if preferred, power taken from a clock drive which may be the clock drive of a chart. Rotation of the input power shaft 10 through the action of the meshing gears 46 and 45 causes the platform 40 to rotate. When the carriage 50 is in a position such that the vertical axis through the balls 87 and 88 is offset with respect to the center of rotation of the platform 40, the ball 87 will be caused to rotate as a result of its frictional engagement with the upper face 89 of the platform. When the ball 87 is rotated, the ball 88 in turn is rotated by the ball 87 and, inasmuch as the ball 88 rolls upon the cylindrical surface or roller surface 93 of the roller shaft, the roller shaft is caused to rotate. When the roller shaft rotates, so also does the cam 96 and the cam track 97 thereof. As the cam track 97 rotates, the cam follower and the cam arm 99 are oscillated to and fro and this in turn causes oscillation first in one rotational direction and then in the other of the output shaft 13.

It will be noted that the speed of rotation of the roller surface will depend upon the location of the vertical axis of the balls 87 and 88 with respect to the axis of rotation at the platform 40. Consequently, if the vertical axis is moved further away from the center of rotation for the same rate of input coming into the mechanism through the input power shaft 10, the balls 87 and 88 will rotate faster. They will continue to rotate still faster as the vertical axis through the balls approaches the outer circumference of the platform. Conversely, as the vertical axis through the balls 87 and 88 approaches the axis of rotation of the platform, the balls will be rotated slower until, when the axis coincides with the axis of rotation, the speed of rotation of the balls will be zero despite the fact that the platform continues to rotate at its regular speed.

The rate of rotation of the roller shaft 90, accordingly, will be directly responsive to the rate of rotation of the balls 87 and 88 and, hence, will be directly affected by the position of the carriage with respect to the platform.

To change the position of the carriage, rotation from the secondary input shaft 11 is transferred to the carriage through the swing arm 60 (Figure 3). As viewed in that figure, should the rotation of the secondary input shaft 11 be in a clockwise direction, the swing arm will likewise pull in a clockwise direction and cause the vertical axis through the balls 87 and 88 to shift further away from the center of rotation of the platform 40. Under such circumstances the roller shaft will be rotated more rapidly, as will also the cam track 97 and, consequently, the output shaft 13 will be oscillated more rapidly. The effect of this would be to produce tracks 14' on the tape 15 where the tracks are numerous for a given unit of length.

Contrarily, when the secondary input shaft rotates counter-clockwise, as viewed in Figure 3, the swing arm 60 moves counter-clockwise and shifts the carriage in a direction such that the vertical axis through the balls 87 and 88 is moved closer to the center of rotation of the platform 40. This results in a slowing down of the speed of rotation of the balls 87 and 88 and in consequence a slowing down of the rate of rotation of the roller shaft 90. Hence, the oscillation of the output shaft 13 will be less frequent and, for a given speed of travel of the tape 15, the spacing of markings 14" will be spread further apart and there will be fewer transverse markings per unit of length.

It will be appreciated that a point of contact between ball 87 and the platform 40 should be capable of careful adjustment without the necessity of holding precise tolerances. To accomplish this the screw plug 76 is supplied. Once in adjustment, as the swing arm swings first in one direction and then the other, the vertical axis of the balls 87 and 88 will always be carried upon a line which will pass through the center of rotation of the platform 40. The universal ball suspension means, which comprises virtually all of the connections in the sundry portions of the mechanism which are permitted motion with respect to each other, makes possible a very precise adjustment of this kind which is highly essential to its effective operation. The ball connection means also serves to reduce frictional forces to virtually a minimum as well as permitting a certain limited movement in all desired directions. This is accomplished by the swing arms without any binding effect elsewhere in the mechanism.

It will be apparent from the character of the device herein disclosed that the two input motions can be readily combined in a virtually frictionless mechanism capable of a very fine degree of adjustment of parts machined to close tolerance, and in a fashion to produce a resultant output motion which has a high degree of accuracy. The mechanism, moreover, is sufficiently versatile to be capable of combining multiple input motion of a considerable variety and rate and of converting it to a single output motion with the utmost dependability.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A mechanical integrator comprising a housing, an input power shaft rotatably mounted in the housing, a platform rotatably mounted in the housing in driven relation to said input power shaft and having a flat radially extending surface, a carriage in the housing, links having universal connections at upper ends to the housing and at lower ends to the carriage swingably suspending the carriage in a position above and adjacent said platform, a secondary input shaft movably mounted in said housing, a swing arm secured at one end to said secondary input shaft and having a universal connection at the other end to one side of the carriage, a second swing arm having universal connections respectively to the housing and to the carriage at the side thereof diametrically opposite said first side whereby to restrict swinging movement of said carriage, a roller shaft rotatably mounted in the housing, a rolling connection on said carriage between said platform and said roller shaft, said carriage and said rolling connection being shiftable relative to said platform and said roller shaft, and an oscillating output element movably mounted on the housing and having an oscillatable driven connection to said roller shaft.

2. A mechanical integrator comprising a housing, an input power shaft rotatably mounted in the housing, a platform rotatably mounted in the housing in driven relation to said input power shaft and having a flat radially extending surface, a carriage in the housing, links having universal connections at upper ends to the housing and at lower ends to the carriage swingably suspending the carriage in a position above and adjacent said platform, a secondary input shaft movably mounted in said housing, a horizontal swing arm secured at one end to said secondary input shaft and having a universal connection at the other end to one side of the carriage, a second swing arm having universal connections respectively to the housing and to the carriage at the side thereof diametrically opposite said first side whereby to restrict movement of said carriage, a roller shaft rotatably mounted in the housing, a rolling connection on said carriage between said platform and said roller shaft, said rolling connection and said carriage being shiftable in an axial direction relative to said shaft, said connection comprising means forming a cylindrical bore in said carriage, a pair of mutually engaging balls in said bore, one of said balls being in traction engagement with said platform and the other of said balls being in traction engagement with said roller shaft, an oscillating output element movably mounted on the housing and having an oscillatable driven connection to said roller shaft.

3. A mechanical integrator comprising a housing, an input power shaft rotatably mounted in the housing, a platform rotatably mounted in the housing in driven relation to said input power shaft and having a flat radially extending surface, a carriage in the housing, links having universal connections at upper ends to the housing and at lower ends to the carriage swingably suspending the carriage in a position above and adjacent said platform, a secondary input shaft movably mounted in said housing, a swing arm secured at one end to said secondary input shaft and having a universal connection at the other end to one side of the carriage, a second swing arm having universal connections respectively to the housing and to the carriage at the side thereof opposite said first side whereby to enable swinging movement of said carriage in a path passing through the center of rotation of said platform, a roller shaft rotatably mounted in the housing, a rolling connection on said carriage between said platform and said roller shaft, said rolling connection and said carriage being shiftable in a direction axially with respect to the roller shaft, an oscillating output shaft rotatably mounted in the housing, and an oscillatable driven connection from said roller shaft to said output shaft comprising an endless eccentric camway on the roller shaft, a cam arm on the output shaft and a cam follower on said cam arm in camming relation to said camway.

4. A mechanical integrator comprising a housing, an input power shaft rotatably mounted in the housing, a platform rotatably mounted in the housing in driven relation to said input power shaft and having a flat radially extending surface, a carriage in the housing, links having universal connections at upper ends to the housing and at lower ends to the carriage swingably suspending the carriage in a position above and adjacent said platform, a secondary input shaft rotatably mounted in vertical position in said housing, a horizontal swing arm secured at one end to said secondary input shaft and having a universal connection at the other end to one side of the carriage, a second swing arm having an adjustable universal connection at one end to the housing and having a universal connection at the other end to the carriage at the side thereof opposite said first side whereby to enable swinging movement of said carriage in a path passing through the center of rotation of the platform, a roller shaft rotatably mounted in the housing in horizontal position, a rotating connection on said carriage between said platform and said roller shaft, said rotating connection and said carriage being horizontally shiftable, said rotating connection comprising means forming a vertical cylindrical bore in said carriage, a pair of mutually engaging balls in said bore, one of said balls being in traction engagement with said platform and the other of said balls being in traction engagement with said roller shaft, an oscillating output shaft rotatably mounted in the housing, and an oscillatable driven connection from said roller to said output shaft comprising an endless eccentric camway on the roller shaft, a cam arm on the output shaft and a cam follower on said cam arm in camming relation to said camway.

5. A mechanical integrator comprising a housing having a chamber therein, a supporting plate in the housing, a power input shaft rotatably mounted in the housing, a platform having a flat upper face and having a driven connection to said input shaft, means forming an annular track between the platform and the plate and a ring of balls in said track supporting the platform, a carriage support secured to an upper portion of the housing, a carriage in a spaced parallel position above the face of the platform and having sides and ends, a swinging suspension for the carriage comprising a series of links between the support and the carriage, and universal ball joints at the ends of the links, positioning means adapted to enable movement of said carriage over the platform in a path through the axis of rotation of the platform, said means comprising a plurality of swing arms having universal ball connections respectively to the carriage and the housing, and a secondary input shaft rotatably mounted in the housing and non-rotatably secured to one of the swing arms, a roller shaft rotatably mounted in the housing and having an axially extending annular drive tread thereon, a rolling connection between said platform and said drive tread, a retainer on said carriage for said rolling connection whereby to effect a shifting of the rolling connection with the carriage, and an output element movably mounted in the housing and having an oscillating connection to said roller shaft.

6. A mechanical integrator comprising a housing having a chamber therein, a supporting plate in the housing, a power input shaft rotatably mounted in the housing, a platform having an annular flange on the lower side, said platform having a flat upper face and having a driven connection to said input shaft, a bearing disc on the plate forming with said flange an annular track and a ring of balls in said track supporting the platform, a carriage support secured to an upper portion of the housing, a carriage in a spaced parallel position above the face of the platform, and having sides and ends, a swinging suspension for the carriage comprising a series of two links between the support and one side of the carriage and one link between the support and the other side of the carriage, and universal ball joints at the ends of the links, positioning means adapted to enable movement of said carriage over the platform in a path through the axis of rotation of the platform, said means comprising a horizontal swing arm having universal ball connections respectively to one end of the carriage and the housing, a second swing arm of equivalent length having a universal ball connection to the other end of the carriage, and a secondary input shaft rotatably mounted in the housing and non-rotatably secured to the last identified swing arm whereby to shift the position of the carriage in response to movement of the secondary input shaft, adjusting means for said positioning means comprising an axially movable screw plug between the housing and the universal ball connection of one of said swing arms, a roller shaft rotatably mounted in the housing and having an axially extending annular drive tread thereon, a rolling connection between said platform and said drive tread, a retainer on said carriage for said rolling connection whereby to effect a shifting of the rolling connection with the carriage, and an output element movably mounted in the housing and having an oscillating connection to said roller shaft.

7. A mechanical integrator comprising a housing having a chamber therein, a supporting plate in the housing, a power input shaft rotatably mounted in the housing, a platform having an annular flange on the lower side, said platform having a flat upper face and having a driven connection to said input shaft, means forming an annular track between the platform and the plate, and a ring of balls in said track supporting the platform, a carriage support secured to an upper portion of the housing, a carriage in a spaced parallel position above the face of the platform and having sides and ends, a swinging suspension for the carriage comprising a series of links between the support and the carriage, and universal ball joints at the ends of the links, positioning means adapted to enable movement of said carriage over the platform in a path through the center of rotation, said means comprising a horizontal swing arm having universal ball connections respectively to one end of the carriage and the housing, a second swing arm of equivalent length having a universal ball connection to the other end of the carriage, and a secondary input shaft rotatably mounted in the housing and non-rotatably secured to the last identified swing arm, a roller shaft rotatably mounted in the housing and having an axially extending annular drive tread thereon, a rolling connection between said platform and said drive tread, said carriage comprising a retainer for said rolling connection whereby to effect a shifting of the rolling connection with the carriage, and an output element movably mounted in the housing and having an oscillating connection to said roller shaft.

8. A mechanical integrator comprising a housing having a chamber therein, a power input shaft rotatably mounted in the housing, a supporting plate fixed in the housing, a platform having an annular flange on the lower side, said platform having a flat upper face and having a driven connection to said input shaft, a bearing disc on the plate forming with said flange an annular track and a ring of balls in said track supporting the platform, adjusting means for said plate comprising shoulder means in the housing, a plurality of balls on a common axis located respectively between said shoulder means and a face of the supporting plate at one end thereof, an adjusting screw rotatably mounted in the housing, the axis of said screw being transverse to and spaced from the common axis of said last balls, a ball connection between said screw and the opposite side of the platform and a spring cushion between the screw and the housing, a carriage in a spaced parallel position above adjacent the platform and having sides and ends, a swinging suspension for the carriage comprising a series of links between the housing and the carriage, and universal ball joints at the ends of the links, positioning means adapted to enable movement of said carriage over the platform in a path through the center of rotation thereof, said means comprising horizontal swing arms having universal ball connections at ends thereof to the carriage, a secondary input shaft rotatably mounted in the housing and non-rotatably secured to one of said swing arms, a roller shaft rotatably mounted in the housing and having an axially extending annular drive tread thereon, said carriage including a rolling connection between said platform and said drive tread, and an output element movably mounted in the housing and having an oscillating connection to said roller shaft.

9. A mechanical integrator comprising a housing having a chamber therein, a power input shaft rotatably mounted in the housing, a supporting plate in the housing, a platform having an annular flange on the lower side, said platform having a flat upper face and having a driven connection to said input shaft, a bearing disc on the plate forming with said flange an annular track and a ring of balls in said track supporting the platform, adjusting means for said plate comprising shoulders on the housing, a series of balls on a common axis and located respectively between said shoulders and one face of the supporting plate at one end thereof, an adjusting screw having a head at the lower end and extending through the plate and having the axis thereof transverse to and spaced from the common axis of said last balls, a ball connection between the head of said screw and the other side of the platform, a bracket in the housing, a nut on the screw non-rotatably mounted in the bracket and a spring cushion between the nut and the housing, a carriage in a spaced parallel position above the face of the platform and having sides and ends, a swinging suspension for the carriage comprising a series of links between the housing and the carriage, and universal ball joints at the ends of the links, positioning means adapted to enable movement of said carriage over the platform in a selected path over the platform, said means comprising swing arms having universal ball connections at the ends thereof to the carriage, a secondary input shaft rotatably mounted in the housing and non-rotatably secured to one of said swing arms, a roller shaft rotatably mounted in the housing and having an axially extending annular drive tread thereon, said carriage including a rolling connection between said platform and said drive tread, and an output element movably mounted in the housing and having an oscillating connection to said roller shaft.

10. A mechanical integrator comprising a housing having a chamber therein, a power input shaft rotatably mounted in the housing, a supporting plate in the housing, a platform having an annular flange on the lower side, said platform having a flat upper face and having a driven connection to said input shaft, a bearing disc on the plate forming with said flange an annular track and a ring of balls in said track supporting the platform, adjusting means for said plate comprising portions of the housing having downwardly facing shoulders, a pair of balls on a common axis and located respectively between said shoulders and an upper face of the plate at one end thereof, an adjusting screw having a head at the lower end and extending through the plate and having the axis thereof transverse to and spaced from the common axis of said last two balls, balls between the head of said screw and the underside of the platform, a bracket in the housing, a nut on the screw non-rotatably mounted in the bracket, and a spring cushion between the nut and the housing, a carriage in a spaced parallel position above the face of the platform and having sides and ends, a swinging suspension for the carriage comprising a series of links between the housing and the carriage, and universal ball joints at the ends of the links, positioning means adapted to enable movement of said carriage over the platform in a path through the axis of rotation of the platform, said means comprising a swing arm having universal ball connections respectively to one end of the carriage and the housing, a second swing arm of equivalent length having a universal ball connection to the other end of the carriage, and a secondary input shaft rotatably mounted in the housing and non-rotatably secured to the last identified swing arm, a roller shaft rotatably mounted in the housing and having an axially extending annular drive tread thereon, said carriage including a rolling connection between said platform and said drive tread, and an output element movably mounted in the housing and having an oscillating connection to said roller shaft.

11. A mechanical integrator for resolving separate input motions into a single output motion comprising a housing, a platform rotatably mounted on the housing and input motion means connected to said platform for rotating said platform in a predetermined plane of rotation, an output shaft member rotatably mounted on the housing adjacent the platform, a carriage movably mounted in the housing intermediate the output shaft member and the platform enabling movement of the carriage relative to the platform between positions at different distances from the center of rotation and substantially along said output shaft member, a motion transmitter on the carriage interconnecting the platform and the output shaft in different operative positions of adjustment and a second motion means independent of said input motion means operably connected to the carriage adapted to move said carriage to said different positions of adjustment whereby to vary the rate of motion of said output shaft member.

12. A mechanical integrator for resolving separate input motions into a single output motion comprising a housing, a platform rotatably mounted on the housing and input motion means connected to said platform for rotating said platform in a predetermined plane of rotation, an output shaft member rotatably mounted on the housing adjacent the platform on an axis parallel to the plane of rotation of the platform, a carriage swingably mounted on the housing intermediate the output shaft member and the platform enabling movement of the carriage relative to the platform between positions thereon at different distances from the center of rotation, and substantially in line with said output shaft member, a motion transmitter on the carriage interconnecting the platform and the output shaft in different operative positions of adjustment and a second separate input motion means operably connected to the carriage adapted to move said carriage to said different positions of adjustment whereby to vary the rate of motion of said output shaft member, said output shaft member having an eccentric motion means thereon, a follower engageable with said motion means and an indicator connected to said follower having a variable motion dependent upon the rotational speed of said output shaft member.

13. A mechanical integrator comprising a rotatably mounted input shaft, a rotatably mounted platform in driven relationship with said input shaft and having a flat radially extending surface, a carriage, supporting links having universal connections at ends thereof to said carriage swingably suspending said carriage in a position adjacent said platform, a secondary input shaft, a swing arm secured at one end to said secondary input shaft and having a universal connection at the other end to one side of said carriage, a second swing arm having a universal connection to the carriage at the side thereof opposite said one side whereby to restrict swinging movement of said carriage, a rotatably mounted roller shaft, a rolling connection on said carriage between said platform and said roller shaft, said shaft and said rolling connection being shiftable relative to said platform and said roller shaft, and an oscillating output element having an oscillatable driven connection to said roller shaft.

14. A mechanical integrator comprising a first rotating shaft and a second rotating shaft mounted on an axis at a right angle to the axis of said first rotating shaft, a platform having a rotatable driven connection to one of said shafts, a motion transmitter interconnecting the platform and said other shaft in different operative positions of adjustment, a carriage movably connected to said motion transmitter in a position enabling movement of the motion transmitter relative to the platform between positions at different distances from the center of rotation of the platform and substantially along the axis of said other shaft, input motion means operably connected to the carriage adapted to move said carriage to said different positions of adjustment, rotary input motion means connected to one of said shafts, an eccentric motion means in operative relationship with the other of said shafts, and a follower engageable with said eccentric motion means having a variable motion dependent upon the rotational speed of the shaft having the eccentric motion means thereon.

15. A mechanical integrator comprising a rotatably mounted input power shaft, a platform mounted in driven relationship to said input shaft, a carriage, links swingably suspending said carriage in positions adjacent said platform, a secondary input means operably connected to said carriage, a roller shaft mounted with the axis thereof substantially parallel to said platform, a guide arm connected to said carriage in a position cooperable with said secondary input means whereby to restrict swinging movement of said carriage in a predetermined direction parallel to the axis of the roller shaft, a rolling connection between said platform and said roller shaft and in engagement with said carriage, and an oscillating output element having an oscillatable driven connection to said roller shaft responsive to variations in the speed of rotation of said roller shaft.

16. A mechanical integrator comprising a housing having a chamber therein, a roller shaft rotatably mounted in the housing, a power input shaft rotatably mounted on the housing, a supporting plate on the housing, a platform having an exposed face and having a driven connection to said input shaft, a low friction support for said platform on said supporting plate and a rolling connection between said platform and said roller shaft, means for adjusting the frictional force between the platform and the roller shaft comprising shoulder means on the housing, a pivot means located between the shoulder means and the supporting plate at one end thereof, a friction setting screw rotatably mounted in the housing, the axis of said screw being transverse to and spaced from said pivot means, a pivot connection between the screw and plate and a resilient member between the screw and the housing.

17. A mechanical integrator comprising a housing having a chamber therein, a roller shaft rotatably mounted in the housing, a power input shaft rotatably mounted on the housing, a supporting plate on the housing, a platform having an exposed face and having a driven connection to said input shaft, a low friction support for said platform on said supporting plate and a rolling connection between said platform and said roller shaft, means for adjusting the frictional force between the platform and the roller shaft comprising shoulder means on the housing, a plurality of balls on a common axis located between the shoulder means and the supporting plate at one end thereof, a friction setting screw rotatably mounted in the housing, the axis of said screw being transverse to and spaced from said plurality of balls means, and a ball connection between the screw and plate.

18. A mechanical integrator for resolving separate input motions into a single output motion comprising a housing, a platform rotatably mounted on the housing and input motion means connected to said platform for rotating said platform in a predetermined plane of rotation, an output shaft member rotatably mounted on the housing adjacent the platform, a carriage movably mounted in the housing intermediate the output shaft member and the platform enabling movement of the carriage relative to the platform between positions at different distances from the center of rotation and substantially along said output shaft member, a motion transmitter on the carriage interconnecting the platform and the output shaft in different operative positions of adjustment, said motion transmitter comprising a bore in the carriage extending normal to the plane of said platform and normal to the axis of said output shaft, said bore having a path of travel during movement of the carriage substantially radial with respect to the platform and parallel with respect to the axis of said output shaft and a plurality of roller means in engagement with each other and with the platform and the output shaft, and a second input motion means independent of first input motion means operably connected to the carriage adapted to move said carriage to said different positions of adjustment whereby to vary the rate of motion of said output shaft member.

References Cited in the file of this patent

UNITED STATES PATENTS

| | | |
|---|---|---|
| 1,448,490 | Moakley | Mar. 13, 1923 |
| 2,002,585 | Rothwell et al. | May 28, 1935 |
| 2,714,328 | Hamburger et al. | Aug. 2, 1955 |
| 2,792,711 | De Mornay | May 21, 1957 |